US010658967B2

(12) United States Patent
Shinomoto et al.

(10) Patent No.: US 10,658,967 B2
(45) Date of Patent: May 19, 2020

(54) MOTOR DRIVE APPARATUS AND AIR CONDITIONER

(71) Applicant: Mitsubishi Electric Corporation, Tokyo (JP)

(72) Inventors: Yosuke Shinomoto, Tokyo (JP); Takuya Shimomugi, Tokyo (JP); Norikazu Ito, Tokyo (JP); Keisuke Uemura, Tokyo (JP); Takashi Yamakawa, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 510 days.

(21) Appl. No.: 15/505,631

(22) PCT Filed: Nov. 4, 2014

(86) PCT No.: PCT/JP2014/079269
§ 371 (c)(1),
(2) Date: Feb. 22, 2017

(87) PCT Pub. No.: WO2016/071964
PCT Pub. Date: May 12, 2016

(65) Prior Publication Data
US 2017/0288595 A1 Oct. 5, 2017

(51) Int. Cl.
*H02P 6/00* (2016.01)
*H02P 27/08* (2006.01)
(Continued)

(52) U.S. Cl.
CPC ............ *H02P 27/085* (2013.01); *H02K 5/18* (2013.01); *H02M 7/48* (2013.01); *H02M 7/5387* (2013.01);
(Continued)

(58) Field of Classification Search
CPC ... G05B 11/28; H02K 5/18; H02M 2001/327; H02M 7/5395; H02P 27/085; H02P 29/68
See application file for complete search history.

(56) References Cited

U.S. PATENT DOCUMENTS 5,068,777 A 11/1991 Ito
7,548,443 B2 6/2009 Arisawa et al.
(Continued)

FOREIGN PATENT DOCUMENTS

CA 2 575 817 A1 10/2006
CN 1049760 A 3/1991
(Continued)

OTHER PUBLICATIONS

Office Action dated Aug. 8, 2017 in the corresponding JP application No. 2016-557378. (Partial English translation attached).
(Continued)

*Primary Examiner* — Muhammad S Islam
(74) *Attorney, Agent, or Firm* — Posz Law Group, PLC

(57) ABSTRACT

A motor drive apparatus driving a motor as a three-phase motor converting direct power into three-phase alternating power, includes: inverter modules equivalent in number to phases of the motor; and a control unit generating PWM signals used to drive the inverter modules with PWM. The inverter modules each include a plurality of switching element pairs connected in parallel, each of the switching element pairs including two switching elements connected in series.

19 Claims, 10 Drawing Sheets

(51) Int. Cl.
  *H02P 29/68* (2016.01)
  *H02M 7/5395* (2006.01)
  *H02M 7/48* (2007.01)
  *H02K 5/18* (2006.01)
  *H02M 7/5387* (2007.01)
  *H02M 1/32* (2007.01)
  *H02M 1/088* (2006.01)
  *G05B 11/28* (2006.01)

(52) U.S. Cl.
  CPC .......... *H02M 7/5395* (2013.01); *H02P 29/68* (2016.02); *G05B 11/28* (2013.01); *H02M 1/088* (2013.01); *H02M 2001/327* (2013.01); *H02M 2007/53876* (2013.01)

(56) References Cited

U.S. PATENT DOCUMENTS

| | | |
|---|---|---|
| 8,270,191 B2 | 9/2012 | Zhu et al. |
| 9,231,513 B2 | 1/2016 | Baba et al. |
| 2011/0310585 A1* | 12/2011 | Suwa ................. H05K 7/20927 361/820 |
| 2012/0187893 A1 | 7/2012 | Baba et al. |
| 2014/0239861 A1* | 8/2014 | Ajima ....................... H02P 6/10 318/400.17 |
| 2014/0286069 A1 | 9/2014 | Shinomoto et al. |
| 2015/0340982 A1* | 11/2015 | Deflorio .................. H02M 7/42 318/139 |
| 2016/0241181 A1* | 8/2016 | Uemura .............. H02M 7/5387 |

FOREIGN PATENT DOCUMENTS

| | | |
|---|---|---|
| CN | 102545671 A | 7/2012 |
| CN | 102625977 A | 8/2012 |
| EP | 1 863 156 A1 | 12/2007 |
| JP | 05-082143 U | 11/1993 |
| JP | 2006-149199 A | 6/2006 |
| JP | 2009-135626 A | 6/2009 |
| JP | 2009-261106 A | 11/2009 |
| JP | 2010-226899 A | 10/2010 |
| JP | 4675902 B2 | 2/2011 |
| JP | 2012-130099 A | 7/2012 |
| JP | 2011-239624 A | 11/2012 |
| JP | 2013-115410 A | 6/2013 |
| JP | 2013-162690 A | 8/2013 |
| WO | 2006/022142 A1 | 3/2006 |
| WO | 2006/103721 A1 | 10/2006 |
| WO | 2013/065150 A1 | 5/2013 |

OTHER PUBLICATIONS

International Search Report of the International Searching Authority dated Jan. 20, 2015 for the corresponding International application No. PCT/JP2014/079269 (and English translation).

Office Action dated Dec. 21, 2018 in the corresponding CN application No. 201480082546.4. (with English translation attached).

\* cited by examiner

| TEMPERATURE DIFFERENCE | AMOUNT OF INCREASE/ DECREASE OF PULSE WIDTH |
|---|---|
| 0≤ΔT＜T1 | α1 |
| T1≤ΔT＜T2 | α2 |
| T2≤ΔT＜T3 | α3 |
| ⋮ | ⋮ |

FIG.7

| CURRENT DIFFERENCE | AMOUNT OF INCREASE/ DECREASE OF PULSE WIDTH |
|---|---|
| $0 \leq \Delta I < I1$ | $\alpha 1$ |
| $I1 \leq \Delta I < I2$ | $\alpha 2$ |
| $I2 \leq \Delta I < I3$ | $\alpha 3$ |
| ⋮ | ⋮ |

MOTOR DRIVE APPARATUS AND AIR CONDITIONER

CROSS REFERENCE TO RELATED APPLICATION

This application is a U.S. national stage application of International Patent Application No. PCT/JP2014/079269 filed on Nov. 4, 2014, the disclosure of which is incorporated herein by reference.

TECHNICAL FIELD

The present invention relates to a motor drive apparatus that includes a switching element and to an air conditioner.

BACKGROUND

There is known a technique for driving a motor by pulse width modulation (PWM) control using switching elements. Patent Literature 1 discloses an example of PWM control.

In a case where the switching elements are implemented as chips, as the chip area increases, it causes a decrease in the yield. If the chip area is reduced, it can improve the yield when the chips are diced from the wafer and can thus achieve a reduction in cost.

PATENT LITERATURE

Patent Literature 1: Japanese Patent No. 4675902

With the conventional technique, when the switching elements are implemented as chips, a cost reduction can be achieved by reducing the chip area. The decrease in the chip area however causes a decrease in the current capacity. Therefore, it has been difficult to achieve both a reduction in cost and an increase in current with a motor drive apparatus that includes switching elements.

SUMMARY

The present invention has been made in view of the above, and an object of the present invention is to obtain a motor drive apparatus that can achieve both a reduction in cost and an increase in current.

In order to solve the above problems and achieve the object, an aspect of the present invention is a motor drive apparatus driving a motor, including: inverter modules equivalent in number to phases of the motor; and a control unit generating a PWM signal used to drive the inverter modules with PWM. The inverter modules each include a plurality of switching element pairs connected in parallel, each of the switching element pairs including two switching elements connected in series.

Advantageous Effects of Invention

An effect of the motor drive apparatus according to the present invention is the ability to achieve both a reduction in cost and an increase in current.

BRIEF DESCRIPTION OF DRAWINGS

FIG. 7 is a diagram illustrating an example of a table that represents a correspondence between a current difference and an amount of increase/decrease of the pulse width according to the second embodiment.

DETAILED DESCRIPTION

A motor drive apparatus and an air conditioner according to embodiments of the present invention will now be described in detail with reference to the drawings. Note that the present invention is not to be limited by the embodiments.

First Embodiment

Figure 1:
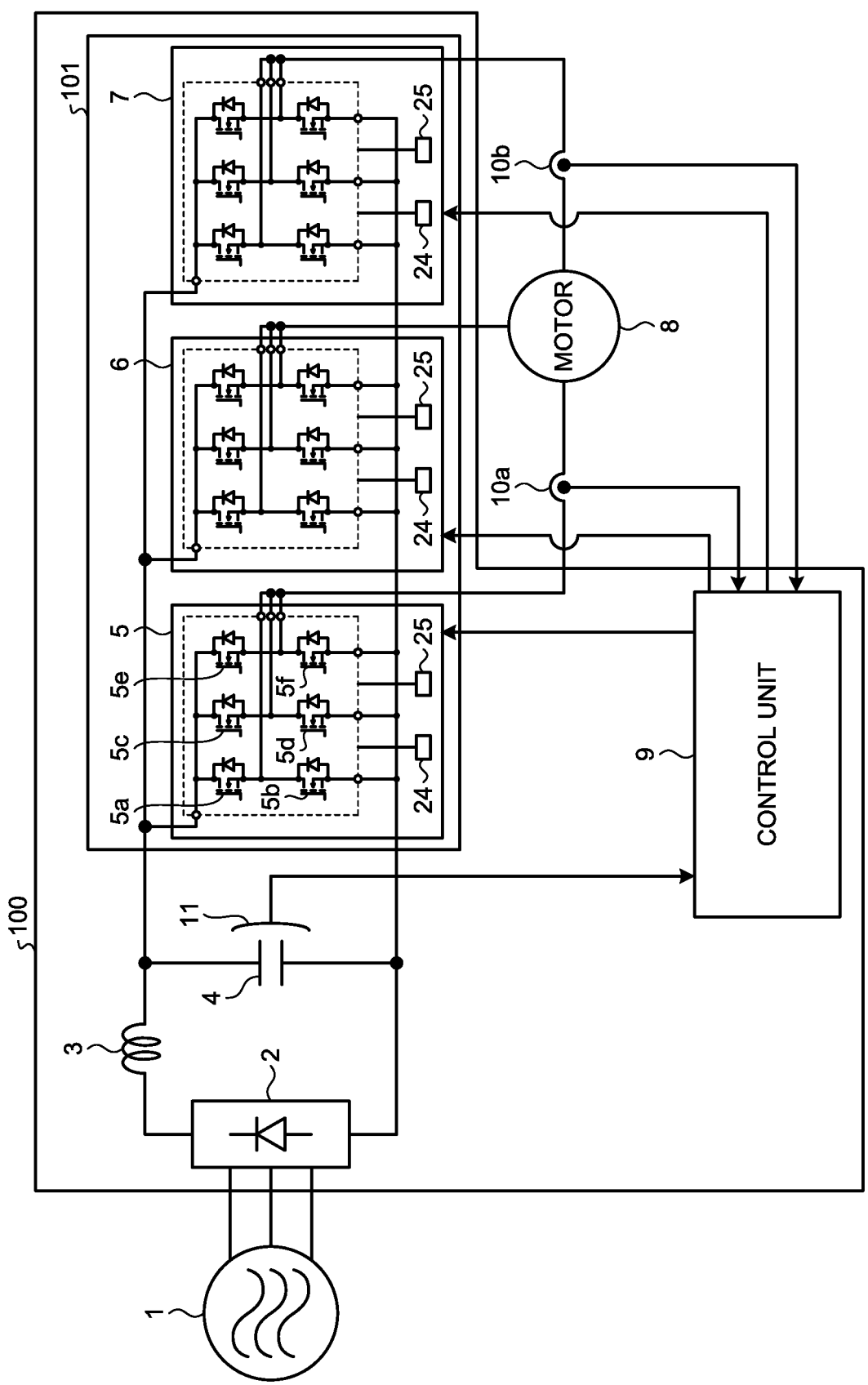
FIG. 1 is a diagram illustrating an example of the configuration of a motor drive apparatus according to a first embodiment.

FIG. 1 is a diagram illustrating an example of the configuration of a motor drive apparatus according to a first embodiment of the present invention. As illustrated in FIG. 1, a motor drive apparatus 100 of the present embodiment includes a rectifier 2 that rectifies alternating current input from an AC power supply 1 to direct current; a reactor 3; a capacitor 4; a voltage detector 11 that detects voltage across the capacitor 4; an inverter unit 101 that converts the direct power into three-phase alternating power and drives a motor 8 that is a three-phase motor; and a control unit 9 that generates PWM signals used to control the inverter unit 101. Current detection units 10a and 10b detecting motor current are provided between the inverter unit 101 and the motor 8.

The motor drive apparatus 100 of the present embodiment can be used as an apparatus that drives a motor in an appliance, such as an air conditioner, a freezing machine, a washer/dryer, a refrigerator, a dehumidifier, a heat pump water heater, a showcase, a vacuum cleaner, a fan motor, a ventilator, a hand dryer, or an induction heating cooker.

The inverter unit 101 includes an inverter module 5 corresponding to a U phase, an inverter module 6 corresponding to a V phase, and an inverter module 7 corresponding to a W phase. Each of the inverter modules 5, 6, and 7 includes switching elements 5a, 5b, 5c, 5d, 5e, and 5f; a drive control unit 24 that controls the switching elements in an upper arm; and a drive control unit 25 that controls the switching elements in a lower arm. In the present embodiment, the switching elements 5a, 5c, and 5e make up the upper arm and the switching elements 5b, 5d, and 5f make up the lower arm. The present embodiment can achieve a high current capacity by arranging the switching elements in parallel as illustrated in FIG. 1, even when the individual current capacity of each of the switching elements 5a, 5b, 5c, 5d, 5e, and 5f is small. The inverter modules 6 and 7 each have a similar configuration to the inverter module 5. Note that for the sake of simplicity, the reference numerals 5a, 5b, 5c, 5d, 5e, and 5f of the switching elements in the inverter modules 6 and 7 are omitted in FIG. 1.

The control unit 9 controls the inverter unit 101 on the basis of the voltage detected by the voltage detector 11 and the motor current detected by each of the current detection units 10a and 10b. Specifically, the control unit 9 generates PWM signals Up, Vp, Wp, Un, Vn, and Wn that are used to control the on/off state of the switching elements in each phase and arm, and outputs the signals to the inverter unit 101. The signals Up, Vp, and Wp are the PWM signals used to control the on/off state of the switching elements in the upper arm of the U, V, and W phases, and the signals Un, Vn, and Wn are the PWM signals used to control the on/off state of the switching elements in the lower arm of the U, V, and W phases. The PWM signal is a pulsed signal that has either a high value indicating an on state or a low value indicating an off state. The width of a period for which the pulse or the on state continues is referred to as the pulse width. Because three switching elements are provided in the same arm in the same phase, the control unit 9 determines the pulse width on the basis of the current flowing when the three switching elements are turned on. In other words, the PWM signal is generated while the three switching elements are treated as one switching element with a high current capacity.

The drive control unit 24 generates PWM signals used to drive the switching elements 5a, 5c, and 5e with PWM on the basis of the PWM signal generated by the control unit 9. The drive control unit 25 generates PWM signals used to drive the switching elements 5b, 5d, and 5f with PWM on the basis of the PWM signal generated by the control unit 9. Specifically, in the case of the inverter module 5 corresponding to the U phase, the drive control unit 24 replicates the signal Up in order to generate three signals Up, and outputs the replicated signals to the switching elements 5a, 5c, and 5e as the PWM signals, and the drive control unit 25 replicates the signal Un in order to generate three signals Un, and outputs the replicated signals to the switching elements 5b, 5d, and 5f as the PWM signals. Similarly, as for each of the inverter module 6 corresponding to the V phase and the inverter module 7 corresponding to the W phase, the drive control unit 24 and the drive control unit 25 generate PWM signals used to drive the switching elements 5a, 5b, 5c, 5d, 5e, and 5f with PWM on the basis of the PWM signals generated by the control unit 9. When a current imbalance within the inverter module is to be suppressed, the drive control unit 25 or both the drive control unit 24 and the drive control unit 25 adjust(s) the pulse width on the basis of the temperature of the switching elements 5a, 5b, 5c, 5d, 5e, and 5f as described later.

Any element may be used as the switching elements 5a, 5b, 5c, 5d, 5e, and 5f, and a wide band-gap semiconductor such as gallium nitride (GaN), silicon carbide (SiC), or diamond can be used as the switching elements. The use of the wide band-gap semiconductor increases the voltage resistance and allowable current density so as to thus be able to reduce the size of the modules. The wide band-gap semiconductor also has high heat resistance so as to be able to reduce the size of the heat dissipating fins of the heat dissipation unit.

Here, a general inverter that drives a three-phase motor will be described as a comparative example. When an inverter is used to drive a three-phase motor, the inverter generally includes, for each phase, a pair of switching elements made up of a switching element in an upper arm and a switching element in a lower arm that are connected in series. The inverter of the comparative example therefore has three pairs of, i.e., six, switching elements in total for three phases. On the other hand, in a case where the switching elements are implemented as chips, an increase in the chip area causes a decrease in the yield. If the chip area is reduced, it can improve the yield when the chips are diced from a wafer. In particular, when SiC is used for the switching elements, the wafer is expensive and there are more crystal defects than in the case when Si is used; therefore, it is desirable to reduce the chip area in order to achieve a cost reduction. When a low current capacity is possible, such as when the inverter module is used in a household air conditioner, a cost reduction can be achieved by using an inverter module that controls three phases with six switching elements that have a small chip area.

A reduction in the chip area however causes a decrease in the current capacity. It is thus difficult to achieve both a reduction in cost and an increase in current with the inverter module of the comparative example or with an inverter module driving a three-phase motor by using six switching elements. In the present embodiment, in contrast, a reduction in cost and an increase in current can both be achieved by using the switching elements each with low current capacity in parallel. Moreover, as illustrated in FIG. 1, the single three-phase inverter module made up of six switching elements and the inverter modules 5, 6, and 7 each made up of six switching elements illustrated in the present embodiment can have a common basic part. The single three-phase inverter module made up of the six switching elements can thus be used as is or, upon making a simple modification to the module, as each of the inverter modules 5, 6, and 7. In other words, the single three-phase inverter module and each of the inverter modules 5, 6, and 7 illustrated in FIG. 1 can be manufactured as identical or similar modules. The inverter modules 5, 6, and 7 adapted for the high current capacity can thus be manufactured at a low cost. The single three-phase module made up of the six switching elements can be used in a household air conditioner, while the inverter unit 101 including the three modules as illustrated in FIG. 1 can be used in an industrial air conditioner, for example. In order to distinguish the inverter unit 101 of the present embodiment, the inverter using a single pair of switching elements in each phase as illustrated in the comparative example will be hereinafter referred to as a single pair inverter, whereas the module implementing the switching elements for three phases, i.e., three pairs of switching elements as one module, will be referred to as a single inverter module.

The inverter module 5 includes three pairs of switching elements as illustrated in FIG. 1. The single pair inverter includes one switching element in an upper arm of the same phase and one switching element in a lower arm of the same phase. On the other hand, the preset embodiment includes three switching elements in the upper arm of the same phase and three switching elements in the lower arm of the same phase. Accordingly, when Am represents the current capacity of a switching element that is implemented, the ideal current capacity of the inverter module including three switching elements connected in parallel equals 3×Am.

Note that although FIG. 1 illustrates an example where the drive control unit 24 and the drive control unit 25 within the inverter module have the function of generating the individual PWM signals used to drive the switching elements 5a, 5b, 5c, 5d, 5e, and 5f with PWM on the basis of the PWM signals generated by the control unit 9, a drive control unit implementing the function of generating the individual PWM signals may instead be provided outside the inverter module. The provision of the drive control unit implementing the aforementioned function outside the inverter module enables the drive control unit 24 and the drive control unit 25 to be common to the inverter module and the single inverter module, thereby increasing the number of parts that can be made common in the manufacture of the modules. Alternatively, the control unit 9 may be adapted to have the function of generating the individual PWM signals.

In the present embodiment, three switching elements in the same arm of the same phase implement an operation similar to that of a single switching element in the single inverter module. That is, the three switching elements in the same arm of the same phase implement the same operation. Accordingly, the three switching elements in the same arm of the same phase have substantially the same current flowing through the elements. In reality, however, a difference in a condition such as temperature causes a difference in the current flowing through the three switching elements even when the three switching elements in the same arm of the same phase perform the same operation. That is, a current imbalance is generated among the three switching elements in the same arm of the same phase.

In particular, when a switching element such as a switching element made of SiC is used, which has a characteristic such that when its temperature increases due to the current flowing therein, the on-resistance decreases and thus current flow is further facilitated, i.e., a negative temperature characteristic, the current imbalance that occurs further causes an increase in the temperature of an element through which a large current flows and thus an increase in the current flowing through the element. The same can be said for a case where a switching element with the negative temperature characteristic such as an insulated gate bipolar transistor (IGBT) made of Si is used instead of a switching element made of SiC. In order for each of the switching elements to not exceed the current capacity in the event of a current imbalance, it is necessary to set the current capacity of the entire inverter module to a value obtained by subtracting a margin from the ideal value 3×Am. It is however desirable that the value of the margin be low in order to increase the current capacity of the inverter module. Accordingly, in order to suppress the current imbalance, the present embodiment measures the temperature of the switching elements and controls the pulse width on the basis of the temperature. Note that the pulse width control based on the temperature of the switching elements according to the present embodiment may be performed when a switching element without a negative temperature characteristic is used.

Figures 2, 3:
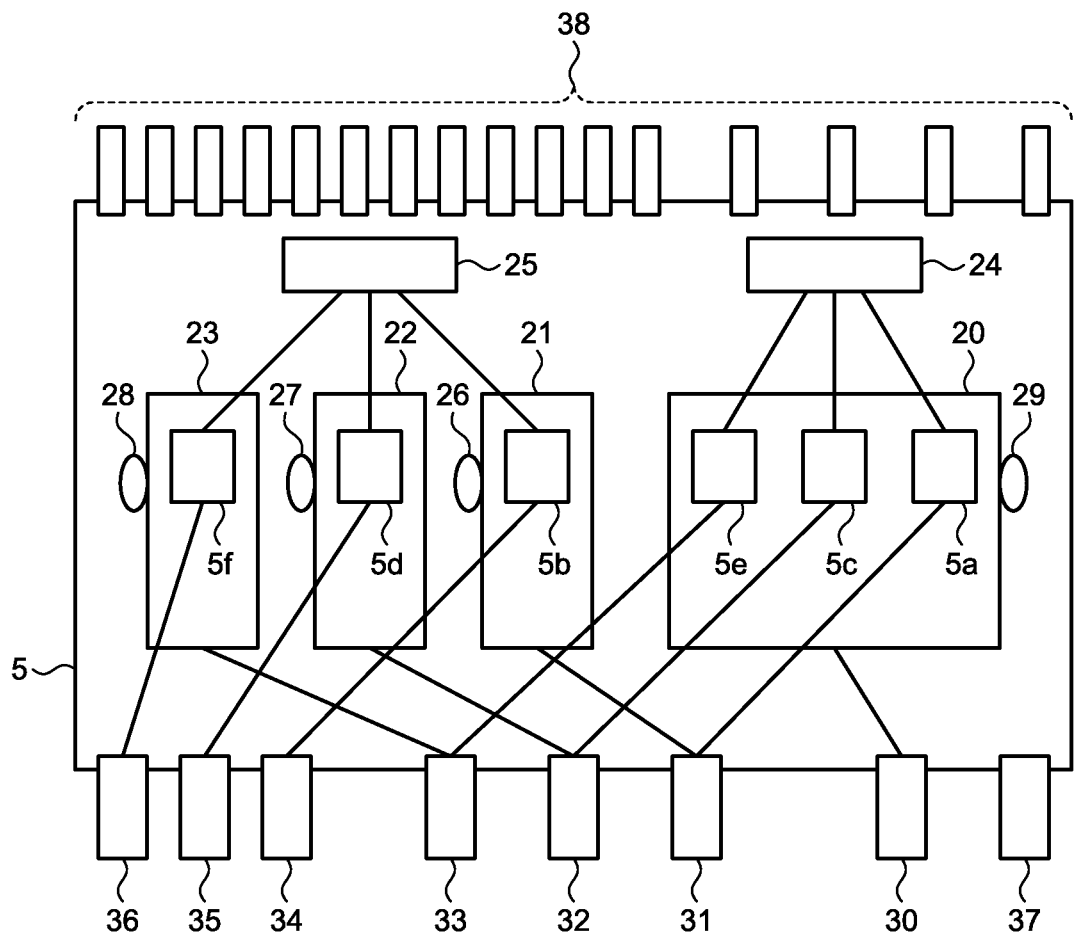
FIG. 2 is a diagram illustrating an example of the internal configuration of an inverter module according to the first embodiment.
FIG. 3 is a diagram illustrating an example of a table that represents a correspondence between a temperature difference and an amount of increase/decrease of the pulse width according to the first embodiment.

FIG. 2 is a diagram illustrating an example of the internal configuration of the inverter module 5. The inverter modules 6 and 7 each have a similar internal configuration to the inverter module 5. FIG. 2 is a diagram schematically illustrating the arrangement of principal parts mounted on the inverter module 5 and does not illustrate actual dimensions. Moreover, the wiring of the parts other than the principal parts is omitted in FIG. 2. The inverter module 5 includes the switching elements 5a, 5b, 5c, 5d, 5e, and 5f as illustrated in FIG. 1 and terminals 30 to 38. Each of the switching elements 5a, 5b, 5c, 5d, 5e, and 5f is implemented as a single chip. The switching elements 5a, 5c, and 5e in the upper arm are mounted on a conductor 20. The switching element 5b is mounted on a conductor 21, the switching element 5d is mounted on a conductor 22, and the switching element 5f is mounted on a conductor 23.

In general, an inverter module for driving a motor in some cases adopts a three-shunt current detection scheme in which N lines of the lower arm are connected outside the module to detect a current by interposing a resistor between the connection point and the switching elements in the lower arm. For that reason, FIG. 2 illustrates an example where the switching elements 5a, 5c, and 5e in the upper arm are mounted on the same conductor and each of the switching elements 5b, 5d, and 5f in the lower arm is mounted on the individual conductor. Besides the example illustrated in FIG. 2, however, each of the switching elements 5a, 5c, and 5e in the upper arm may also be arranged on an individual conductor.

As illustrated in FIG. 2, the inverter module 5 includes a temperature measurement unit 26 measuring the temperature of the conductor 21; a temperature measurement unit 27 measuring the temperature of the conductor 22; a temperature measurement unit 28 measuring the temperature of the conductor 23, and a temperature measurement unit 29 measuring the temperature of the conductor 20. The temperature of each of the switching elements 5b, 5d, and 5f in the lower arm can thus be measured individually.

Next, there will be a description of pulse width control based on the temperatures of the switching elements 5b, 5d, and 5f in the lower arm. Although two examples will be described below, the pulse width control based on the temperatures of the switching elements 5b, 5d, and 5f may be performed in any order as long as the method reduces the pulse width of the PWM signal for the switching element having a high temperature and increases the pulse width of the PWM signal for the switching element having a low temperature.

The first example is a method of adjusting the pulse width for the elements with the highest and lowest temperatures among the temperatures measured by the temperature measurement units 26, 27, and 28, i.e., among the temperatures of the switching elements 5b, 5d, and 5f. The temperature difference and the amount of increase/decrease of the pulse width are stored in advance in a table. FIG. 3 is a diagram illustrating an example of the table representing a correspondence between the temperature difference and the amount of increase/decrease of the pulse width. The drive control unit 25 obtains a temperature difference $\Delta T$ between the highest and the lowest of the temperatures measured by the temperature measurement units 26, 27, and 28. Note that the temperature difference $\Delta T$ is the absolute value of the temperature difference. The drive control unit 25 then refers to the table and obtains an amount of increase/decrease $p\alpha$ of the pulse width corresponding to the obtained temperature difference. The amount $p\alpha$ is equal to $\alpha 1$ when the difference $\Delta T$ is zero or larger and smaller than T1, for example. The drive control unit 25 replicates the PWM signal output from the control unit 9 in order to generate three PWM signals and increases or reduces the pulse width of each of the three PWM signals by using the amount of increase/decrease pα of the pulse width.

Figure 4:
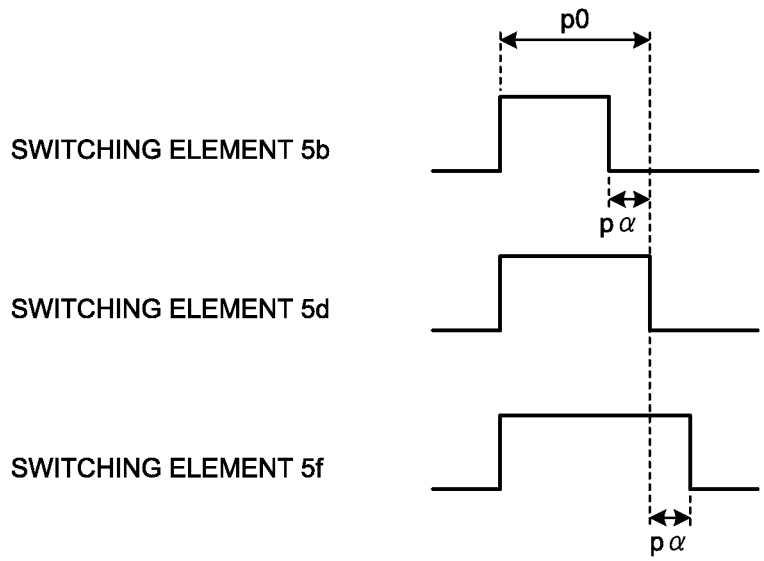
FIG. 4 is a diagram illustrating an example, according to the first embodiment, of PWM signals used to drive switching elements after the pulse width is increased or reduced.

FIG. 4 is a diagram illustrating an example of PWM signals used to drive the switching elements 5b, 5d, and 5f after the pulse width is increased or reduced. A p0 indicates the pulse width of the PWM signal used to drive the switching elements 5b, 5d, and 5f before the pulse width is increased or reduced, i.e., the PWM signal output from the control unit 9. FIG. 4 illustrates an example where, among the switching elements 5b, 5d, and 5f, the switching element 5b has the highest temperature, the switching element 5d has the second highest temperature, and the switching element 5f has the lowest temperature. In other words, the temperature measured by the temperature measurement unit 26 is the highest, the temperature measured by the temperature measurement unit 27 is the second highest, and the temperature measured by the temperature measurement unit 28 is the lowest. The drive control unit 25 obtains the temperature difference ΔT between the temperature measured by the temperature measurement unit 26 and the temperature measured by the temperature measurement unit 28. The drive control unit 25 then refers to the table and obtains the amount of increase/decrease pα of the pulse width corresponding to the temperature difference to increase the pulse width of the switching element 5f by the amount of increase/decrease pα and reduce the pulse width of the switching element 5b by the amount of increase/decrease pα.

Note that although the amount of increase/decrease of the pulse width corresponding to the temperature difference is stored in the table in the aforementioned example, the ratio of increase/decrease pr of the pulse width corresponding to the temperature difference may instead be stored in a table. The ratio of increase/decrease pr corresponds to the value obtained by dividing the amount of increase/decrease of the pulse width by the pulse width of the PWM signal before the pulse width is increased or reduced. Accordingly, the drive control unit 25 refers to the table and obtains the ratio of increase/decrease pr of the pulse width corresponding to the temperature difference to increase or reduce the pulse width in a similar manner to that of the aforementioned example by using, as the amount of increase/decrease, the value (p0×pr) obtained by multiplying the pulse width p0 for the switching element with the highest temperature by pr. Although not illustrated in the figure, an effect equivalent to that of the aforementioned example can be achieved by increasing or reducing the pulse width by pα/2 on each of the rising side and the falling side of the pulse relative to the center of the pulse, instead of increasing or reducing the pulse width from the falling side as illustrated in FIG. 4.

The second example is a method of reducing the pulse width of the PWM signal for the switching element with the highest temperature among the temperatures of the switching elements 5b, 5d, and 5f and increasing the pulse width of the PWM signals for the remaining two switching elements. That is, the second example is a method of adjusting the pulse width for each of the three switching elements. First, as with the first example, the drive control unit 25 stores in advance the temperature difference and the amount of increase/decrease of the pulse width in a table. The drive control unit 25 obtains the temperature difference ΔT between the highest and the lowest of the temperatures measured by the temperature measurement units 26, 27, and 28. The drive control unit 25 then refers to the table and obtains the amount of increase/decrease pα of the pulse width corresponding to the temperature difference. The drive control unit 25 reduces the pulse width of the PWM signal for the switching element with the highest temperature by the amount pα. The drive control unit 25 then increases the pulse width of the PWM signal for each of the two switching elements other than the switching element with the highest temperature. At this time, with pβ1 representing the amount of increase of the pulse width for the switching element with the second highest temperature and pβ2 representing the amount of increase of the pulse width for the switching element with the lowest temperature, the drive control unit 25 determines pβ1 and pβ2 such that pα=pβ1+pβ2 is satisfied. The ratio of pβ1 to pβ2 may be determined in any manner, and an example is using the ratio of the differences in the temperature between each of the switching elements and the switching element with the highest temperature.

Figure 5:
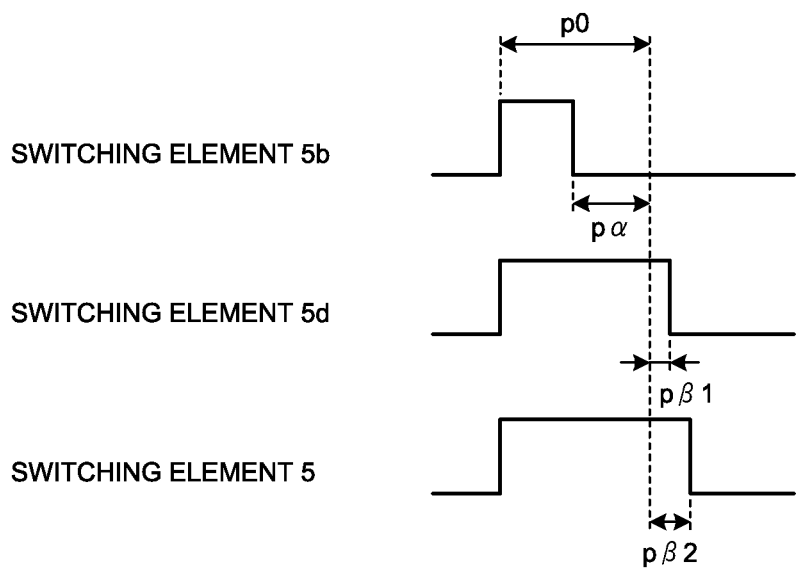
FIG. 5 is a diagram illustrating an example, when the pulse width of three switching elements of the first embodiment is adjusted, of PWM signals used to drive the switching elements after the pulse width is increased or reduced.

FIG. 5 is a diagram illustrating an example, when the pulse width of the three switching elements is adjusted, of the PWM signals used to drive the switching elements 5b, 5d, and 5f after the pulse width is increased or reduced. As with the example illustrated in FIG. 4, FIG. 5 illustrates an example where, among the switching elements 5b, 5d, and 5f, the switching element 5b has the highest temperature, the switching element 5d has the second highest temperature, and the switching element 5f has the lowest temperature. The drive control unit 25 obtains the temperature difference ΔT between the highest and the lowest of the temperatures measured by the temperature measurement units 26, 27, and 28, and obtains the amount pα corresponding to the difference ΔT by referring to the table. The drive control unit 25 further determines pβ1 and pβ2 such that pα=pβ1+pβ2 is satisfied. Assuming that the ratio of pβ1 to pβ2 is determined by the ratio of the temperature differences with ΔT1 representing the absolute value of the temperature difference between the switching element 5d and the switching element 5b and ΔT2 representing the absolute value of the temperature difference between the switching element 5f and the switching element 5d, pβ1 and pβ2 can be determined from the following expressions (1) and (2).

$$p\beta1:p\beta2=\Delta T1:\Delta T2, \text{ or } p\beta1=p\alpha\times\Delta T1/\Delta T \tag{1}$$

$$p\alpha=p\beta1+p\beta2 \tag{2}$$

The drive control unit 25 reduces the pulse width of the switching element 5b by the amount of increase/decrease pα, increases the pulse width of the switching element 5d by the amount of increase/decrease pβ1, and increases the pulse width of the switching element 5f by the amount of increase/decrease pβ2. Note that, instead of the table illustrated in FIG. 3, the ratio of increase/decrease pr of the pulse width corresponding to the temperature difference may be stored in a table as with the example illustrated in FIG. 4. The method of increasing or reducing the pulse width has been described as an example. Alternatively, the following method may, for example, be used. That is, the temperature of a switching element itself is used instead of the temperature difference, and, when the temperature of the switching element equals a threshold or larger, the pulse width of the switching element is reduced by a fixed value and the pulse width of the other switching elements is increased by a fixed value. Alternatively, the table illustrated in FIG. 3 may be stored for each temperature to select a table on the basis of the temperature of the switching element with the highest temperature, and the selected table may be used to adjust the pulse width on the basis of the temperature difference. The table is, for example, stored for each temperature range such that a table #1 is stored for the temperature lower than Ta1 and a table #2 is stored for the temperature Ta1 or higher and lower than Ta2. The table to be used is then selected on the basis of the temperature of the switching element with the highest temperature.

The drive control unit 25 performs the aforementioned pulse width adjustment at regular time intervals. The regular time interval may be set equal to a carrier cycle or longer. Control, for example, may be performed such that, every minute, the pulse width is adjusted for 10 seconds and not adjusted for the remaining 50 seconds, i.e., the PWM signals output from the control unit 9 are left as they are. Alternatively, in order to simplify processing, without using a table, an adjustment may be performed in which the pulse width is not adjusted when ΔI is smaller than a threshold and, when ΔI exceeds the threshold, the pulse width for the switching element with the highest temperature is reduced by a fixed value while the pulse width for the switching element with the lowest temperature is increased by a fixed value.

Note that although the drive control unit 25 within the inverter module 5 adjusts the pulse width or increases/reduces the pulse width in the example illustrated in FIG. 2, the pulse width may instead be adjusted outside the inverter module 5. In this case, the inverter module 5 outputs signals indicating the temperatures measured by the temperature measurement units 26, 27, and 28 to the outside. When there are unused terminals in the terminal group 38 for the signal of low voltage or of a low-voltage system, the signals indicating the temperatures measured by the temperature measurement units 26, 27, and 28 may be output directly from the terminals to the outside of the module. When the number of unused terminals is small, it is applicable to output to the outside a signal indicating the switching element with the highest temperature among the temperatures measured by the temperature measurement units 26, 27, and 28 or a signal indicating the switching element with the highest temperature and the temperature difference ΔT. The configuration may be, for example, such that the value of the signal indicating the switching element with the highest temperature is set to 4.5 V when the switching element 5b is the switching element with the highest temperature, is set to 2.5 V when the switching element 5d is the switching element with the highest temperature, and is set to 0.5 V when the switching element 5f is the switching element with the highest temperature. When the signal is used to further indicate the temperature difference, each of the ranges from 0.5 V to 2.5 V, from 2.5 V to 4.5 V, and from 4.5 V to larger values may be divided into a plurality of levels to indicate the temperature difference by using the voltage difference with respect to 0.5 V, 2.5 V, or 4.5 V.

The control unit 9 may then replicate each of the PWM signals Up, Vp, Wp, Un, Vn, and Wn in order to generate three of each of the PWM signals and adjust the pulse width of each of the PWM signals on the basis of the temperature output from the inverter module 5. Alternatively, another drive control unit other than the control unit 9 may be provided outside the inverter module 5 and this drive control unit may replicate each of the PWM signals Up, Vp, Wp, Un, Vn and Wn in order to generate three of each of the PWM signals and adjust the pulse width of each of the PWM signals on the basis of the temperature output from the inverter module 5.

Although the temperature is measured for each conductor in the example of the configuration illustrated in FIG. 2, the temperature measurement points are not limited to the example in FIG. 2. Temperature at a different site within the inverter modules 5, 6, and 7 may be measured to estimate the temperature of each of the switching elements or temperature at a site near each of the switching elements outside the inverter modules 5, 6, and 7 may be measured. The measurement of the temperature outside the inverter modules 5, 6, and 7 and the adjustment of the pulse width outside the inverter modules 5, 6, and 7 can increase the number of parts that are common to the inverter modules 5, 6, and 7 and the single inverter module and enable the inverter modules 5, 6, and 7 to be manufactured at a lower cost.

In the example of the configuration illustrated in FIG. 2, the switching elements 5a, 5c, and 5e in the upper arm are arranged on the same conductor; therefore, the temperatures of the switching elements 5a, 5c, and 5e are balanced easily to have a small temperature difference among the switching elements 5a, 5c, and 5e. It is thus not necessary to perform control for suppressing the current imbalance on the switching elements 5a, 5c, and 5e in the upper arm. Although in the example of the configuration illustrated in FIG. 2, the temperature of the conductor 20 on which the switching elements 5a, 5c, and 5e in the upper arm are mounted is measured, the temperature of the conductor 20 can be used to determine whether or not the temperatures of the switching elements 5a, 5c, and 5e exceed an upper limit. When each of the switching elements 5a, 5c, and 5e in the upper arm is arranged on an individual conductor, a temperature measurement unit may be provided for each conductor as with the lower arm to perform the pulse width control as with the lower arm. Although the adjustments of the pulse width may have different results in the upper arm and the lower arm, a problem can be avoided by adjusting the pulse width according to the predetermined setting. For example, the pulse width is adjusted according to the result with a higher absolute temperature or according to the result that is predetermined when the temperature has not reached a preset temperature. The present application aims at suppressing the current imbalance such that the current approaches 3×Am.

Note that for the switching elements 5a, 5c, and 5e in the upper arm, it is possible to perform a control such that a variation in temperature dependency of on-resistances among the chips, i.e., among the switching elements, is corrected. Although the current imbalance is small compared to the change in current in accordance with the temperature, the variation in the on-resistances may occur among the switching elements even when the temperature thereof is the same. Accordingly, the characteristic that indicates a relationship between the temperature of each switching element and the current flowing therethrough can be determined in advance by a measurement or the like and the pulse width can be controlled in accordance with the temperature by using this characteristic. For example, the ratio R1:R2:R3 of the currents flowing through the switching elements 5a, 5c, and 5e is obtained in advance for each temperature and the amount of increase/decrease of the pulse width for each of the switching elements 5a, 5c, and 5e is determined for each temperature on the basis of the ratio of the currents. The drive control unit 24 stores, as a table, the temperature and the amount of increase/decrease of the pulse width for each of the switching elements 5a, 5c, and 5e and refers to the table to obtain the amount of increase/decrease of the pulse width corresponding to the temperature measured by the temperature measurement unit 29. The drive control unit 24 then increases or reduces the pulse width at the time of generating the individual PWM signal for each of the switching elements 5a, 5c, and 5e on the basis of the PWM signal generated by the control unit 9.

Note that for the switching elements 5b, 5d, and 5f in the lower arm as well, a correction may be made on the basis of the characteristic of each of the switching elements.

As described above, the inverter modules 5, 6, and 7 of the present embodiment and the single inverter module may be indistinguishable from each other when they are made common. A distinction may thus be made in the appearance by changing the number of terminals or the like. Alternatively, with the appearance such as the number of terminals being the same, the modules can be made distinguishable from each other by using a terminal 37 in FIG. 2 as a dummy terminal and providing connected and unconnected configurations inside the modules. For example, the inverter modules 5, 6, and 7 of the present embodiment and the single inverter module can be distinguished from each other in a continuity test performed on the terminals 30 and 37 by providing a configuration in which the terminal 37 and the adjacent terminal 30 are connected inside the module in each of the inverter modules 5, 6, and 7 of the present embodiment but are not connected in the single inverter module. Such a configuration enables an erroneous mounting to be easily identified during assembly.

As described above, the motor drive apparatus of the present embodiment includes, for each phase, an inverter module in which a plurality of pairs of an upper-arm switching element and a lower-arm switching element are connected in parallel. An increase in current can thus be achieved while keeping the cost down. Moreover, the current imbalance is adjusted by measuring the temperature. Therefore, the current imbalance need not be taken into consideration when the current capacity of the inverter module is determined, whereby the current capacity of each switching element can be used effectively.

Note that although FIG. 1 illustrates an example where the inverter module for one phase is configured to include three pairs of switching elements, the configuration is not limited thereto and it is satisfactory if the inverter module for one phase includes a plurality of pairs of switching elements. Moreover, it is satisfactory if the temperature equivalent to the temperatures of at least two of the switching elements is measured to adjust the pulse width on the basis of the measured temperature. As an example, one inverter module made up of two pairs of switching elements, i.e., four elements in total, may be used as an inverter module for one phase. In this case, the inverter module can also be used as a two-phase inverter module having a low current capacity and made up of four switching elements. Moreover, although FIG. 1 illustrates an example of the configuration in which the motor 8 is a three-phase motor, the motor 8 is not limited to a three-phase motor and a reduction in cost and an increase in current can be achieved as with the example in FIG. 1 by using the inverter modules corresponding in number to the phases.

Although FIG. 1 illustrates an example of the configuration in which one inverter module is used for one phase, a plurality of inverter modules may be provided for one phase. As an example, two inverter modules connected in parallel may be used for one phase such that the number of inverter modules used equals twice the number of phases. Moreover, although FIG. 1 illustrates an example of the configuration where the alternating current from the AC power supply 1 is rectified by the rectifier 2, this is not a limitation as long as the direct current is input to the inverter modules 5, 6, and 7, and the configuration may be such that the direct current is input to the inverter modules 5, 6, and 7 from a DC power supply.

Second Embodiment

A motor drive apparatus according to a second embodiment of the present invention will now be described. The first embodiment illustrates an example where the temperature of the switching elements is measured and the pulse width is adjusted on the basis of the temperature. In the present embodiment, in addition to the temperature, currents flowing through the switching elements are detected.

Figure 6:
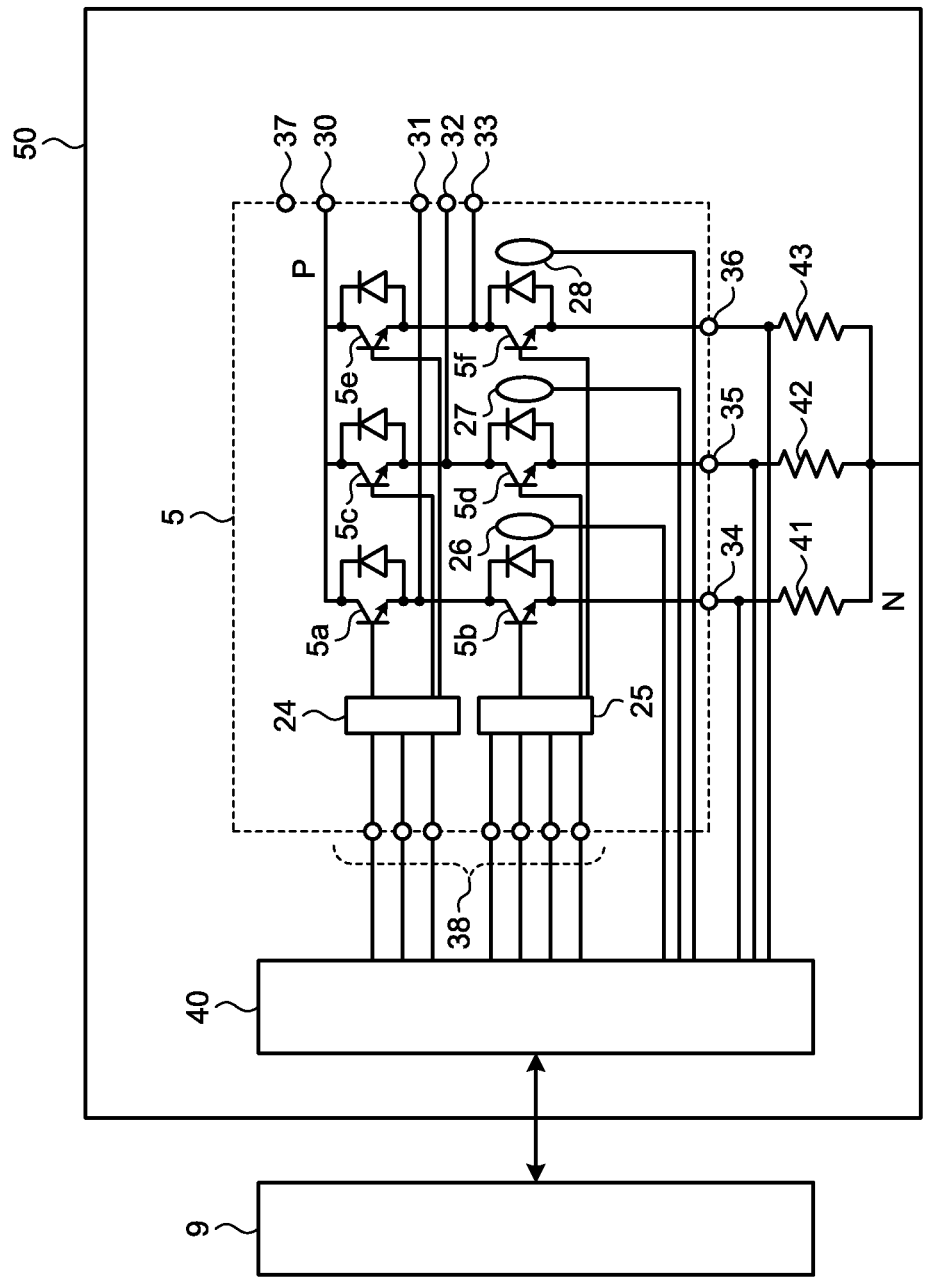
FIG. 6 is a diagram illustrating an example of the configuration of an inverter module according to a second embodiment.

FIG. 6 is a diagram illustrating an example of the configuration of an inverter module 50 according to the present embodiment. Components having functions similar to those of the first embodiment will be denoted by reference numerals identical to those of the components in the first embodiment and a redundant description will be omitted. As illustrated in FIG. 6, the inverter module 50 of the present embodiment includes the inverter module 5 illustrated in the first embodiment; resistors 41, 42, and 43; and a drive control unit 40 that controls driving of the switching elements in the inverter module 5. The motor drive apparatus of the present embodiment includes the inverter modules 50 for respective phase, i.e., three inverter modules 50 in total, instead of the inverter modules 5, 6, and 7 of the motor drive apparatus illustrated in FIG. 1.

In the present embodiment, the drive control unit 25 in the inverter module 5 of FIG. 2 does not perform a replication of a PWM signal and an adjustment of the pulse width, the drive control unit 40 is provided outside the inverter module 5, and the drive control unit 40 performs a replication of a PWM signal and an adjustment of the pulse width. The resistor 41 is used to detect current flowing through the switching element 5*b* in a lower arm, the resistor 42 is used to detect current flowing through the switching element 5*d* in the lower arm, and the resistor 43 is used to detect current flowing through the switching element 5*f* in the lower arm. The temperature measured by each of the temperature measurement units 26, 27, and 28 is input to the drive control unit 40. Instead of providing the drive control unit 40 for each phase, a single drive control unit 40 may perform processing for three phases.

The drive control unit 40 adjusts the pulse width by using the current and temperature. Any method can be used to adjust the pulse width by using the current and temperature as long as the method reduces the pulse width when the current is large and reduces the pulse width when the temperature is high and an example of a method of adjusting the pulse width will be described below.

The drive control unit 40 stores a table representing a correspondence between the current difference and the amount of increase/decrease of the pulse width for each temperature of the switching element. FIG. 7 is a diagram illustrating an example of the table representing the correspondence between the current difference and the amount of increase/decrease of the pulse width. The table is, for example, stored for each temperature such that a table #1 is stored for temperature lower than Ta1 and a table #2 is stored for the temperature Ta1 or higher and lower than Ta2. The drive control unit 40 then selects a table on the basis of the temperature of the switching element. The drive control unit adjusts the pulse width on the basis of the measurement of the current flowing through the switching element and the selected table.

A method of adjusting the pulse width by using the current difference after the selection of the table will now be described. The drive control unit 40 obtains a current difference $\Delta I$ between the largest current and the lowest current among the detected currents flowing through the switching elements 5*b*, 5*e*, and 5*f*. Note that the current difference $\Delta I$ is the absolute value of the current difference. The drive control unit 40 then refers to the table and obtains the amount of increase/decrease $p\alpha$ of the pulse width corresponding to the obtained current difference. The drive control unit 40 replicates the PWM signal output from the control unit 9 in order to generate three PWM signals and increases or reduces the pulse width of each of the three PWM signals by using the amount of increase/decrease $p\alpha$ of the pulse width. As with the aforementioned adjustment of the pulse width using the temperature, the pulse width for the switching element with the largest current is reduced by the amount $p\alpha$ and the pulse width for the switching element with the lowest current is increased by the amount $p\alpha$. Alternatively, the pulse width for the switching element with the largest current may be reduced by the amount $p\alpha$ and the pulse width for the remaining two switching elements may be increased by the amount $p\alpha$ in total. Other methods of adjusting the pulse width can also be used as is the case with the method of adjusting the pulse width on the basis of the temperature difference.

Instead of the method of switching the table according to the temperature as described above, one table representing the correspondence between the current difference and the pulse width and one table representing the correspondence between the temperature difference and the pulse width may be stored and the adjustment of the pulse width using the temperature difference and the adjustment of the pulse width using the current difference may be switched in accordance with some conditions. It may be adapted, for example, to perform the adjustment of the pulse width using the current difference when the current difference $\Delta I$ equals a threshold or larger and perform the adjustment of the pulse width using the temperature difference when the current difference $\Delta I$ is smaller than the threshold. The condition under which the method of adjusting the pulse width is switched is not limited to the aforementioned example. The tables of the temperature difference may be switched according to the current difference $\Delta I$ or the tables of the current difference may be switched according to the temperature difference $\Delta T$.

Note that not the drive control unit 40 but the drive control unit 25 in the inverter module 5 may adjust the pulse width by using the temperature and current, in which case the detected current is input to the inverter module 5.

As described above, the present embodiment includes, for each phase, an inverter module in which a plurality of pairs of an upper-arm switching element and a lower-arm switching element are connected in parallel and adjusts the pulse width on the basis of the current in addition to the temperature. An effect of the first embodiment can thus be obtained and a reduction in the current imbalance can be achieved with higher accuracy.

Third Embodiment

A motor drive apparatus according to a third embodiment of the present invention will now be described. The motor drive apparatus of the present embodiment includes the inverter modules 5, 6, and 7 described in the first embodiment or three inverter modules 50 described in the second embodiment. Although there will be a description of an example where the inverter modules 5, 6, and 7 described in the first embodiment are provided, the description applies similarly to the case where three inverter modules 50 described in the second embodiment are provided.

In the present embodiment, there will be a description of an example of the arrangement of the modules and a method of dissipating heat when the inverter modules 5, 6, and 7 described in the first embodiment or three inverter modules 50 described in the second embodiment are provided. Although a single inverter module has three phases in one module, the first or second embodiment includes three inverter modules and thus uses a larger number of heat dissipating fins than when a single inverter module is used.

Figure 8:
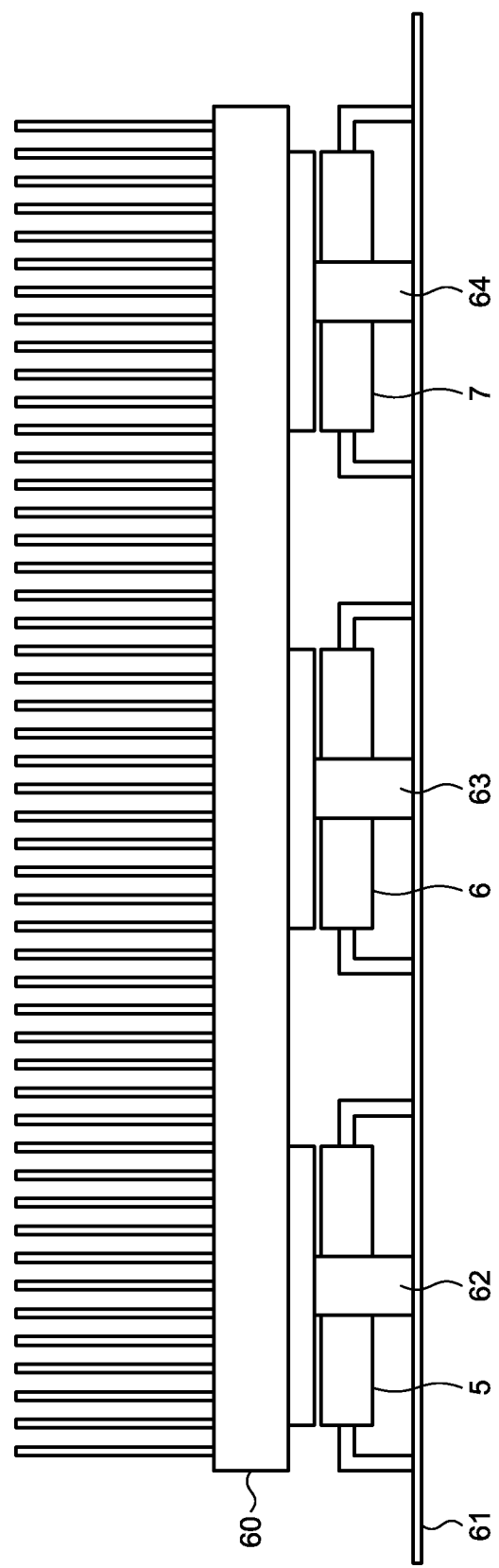
FIG. 8 is a diagram illustrating an example of the arrangement of a heat dissipation unit having heat dissipating fins according to a third embodiment.
Figure 9:
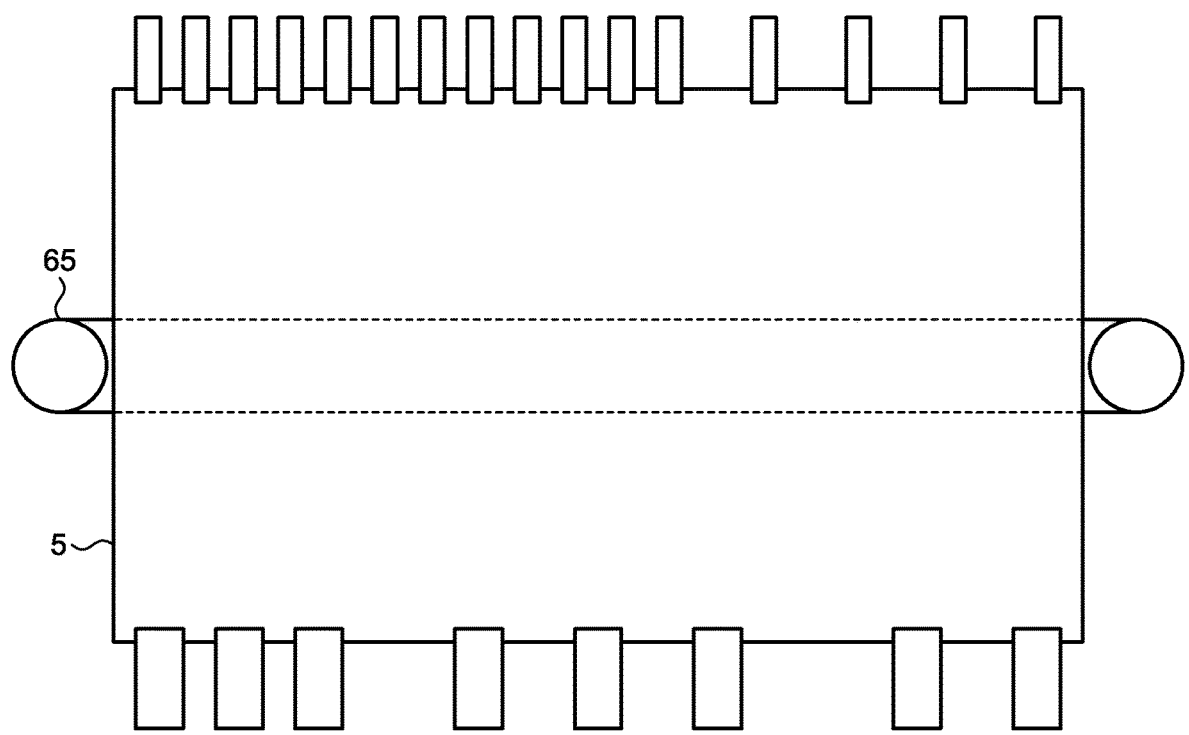
FIG. 9 is a diagram illustrating an example of the arrangement of an auxiliary member according to the third embodiment.

FIG. 8 is a diagram illustrating an example of the arrangement of a heat dissipation unit 60 having the heat dissipating fins. FIG. 8 illustrates a state where the inverter modules 5, 6, and 7 are mounted on a substrate 61. Note that although FIG. 8 illustrates an example where the modules are mounted by using through holes, the modules may be surface mounted. When the heat dissipation unit 60 is installed across the three inverter modules, a difference in the height of the inverter modules causes a gap between the modules and the heat dissipation unit 60 and results in decreased heat dissipation efficiency. Accordingly, protrusions 62, 63 and 64 are provided as illustrated in FIG. 8 to accommodate the difference in the height. Alternatively, an auxiliary member 65 for height alignment may be provided to align the height of the three inverter modules. FIG. 9 is a diagram illustrating an example of the arrangement of the auxiliary member 65. One auxiliary member 65 may be provided in each module and there is no problem with providing three auxiliary members that are linked together. It is however desirable to connect the inverter modules 5, 6, and 7 and the heat dissipation unit 60 at a height a little lower than the height of the heat dissipating fins in order to avoid interference with other components mounted on the substrate 61. Note that the height alignment may be performed not only by the method described in the aforementioned example but by a method that uses a pressing member.

Moreover, as illustrated in FIG. 8, it is desirable to arrange the heat dissipation unit such that the longitudinal direction of the heat dissipating fins is orthogonal to the direction of the alignment of the inverter modules and that the direction along a passage of the cooling medium such as air or water is orthogonal to the direction of the alignment of the inverter modules. This can reduce the temperature variation as well as the amount of increase/decrease of the pulse width so as to be able to implement the amount of current that can be caused to flow through the inverter modules to near its limit. The difference in the temperature among the inverter modules can also be reduced. When the direction along the passage of the cooling medium such as air or water is parallel to the direction of the alignment of the inverter modules, the temperature variation may be reduced by increasing the pitch of the heat dissipating fins on the upstream side of the passage and reducing the pitch on the downstream side of the passage.

Moreover, as described in the first or second embodiment, when one inverter module is used for each phase, the parallel configuration can be implemented within the module; therefore, the parallelization does not increase the inductance of the wiring and noise and a voltage surge can be suppressed.

Figure 10:
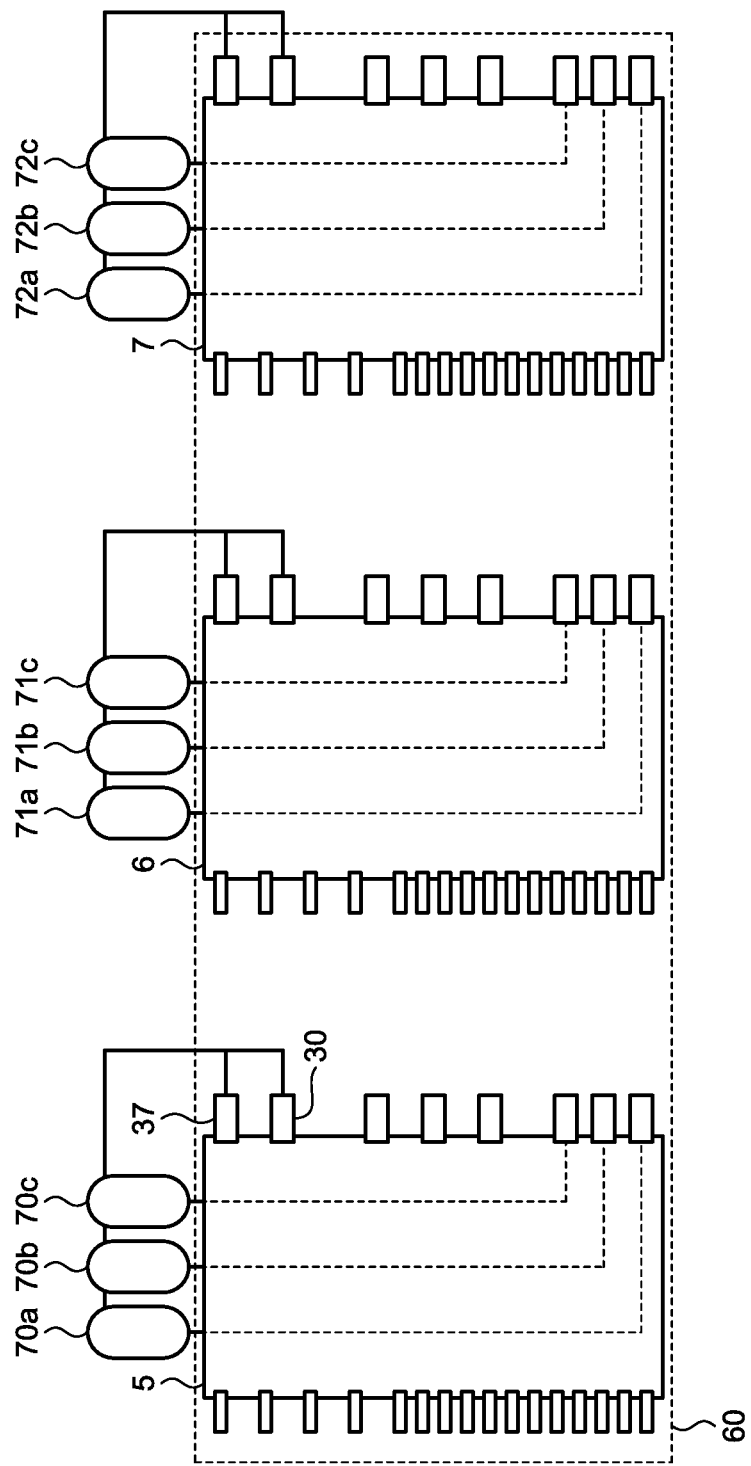
FIG. 10 is a diagram illustrating an example of the arrangement of capacitors according to the third embodiment.
Figure 11:
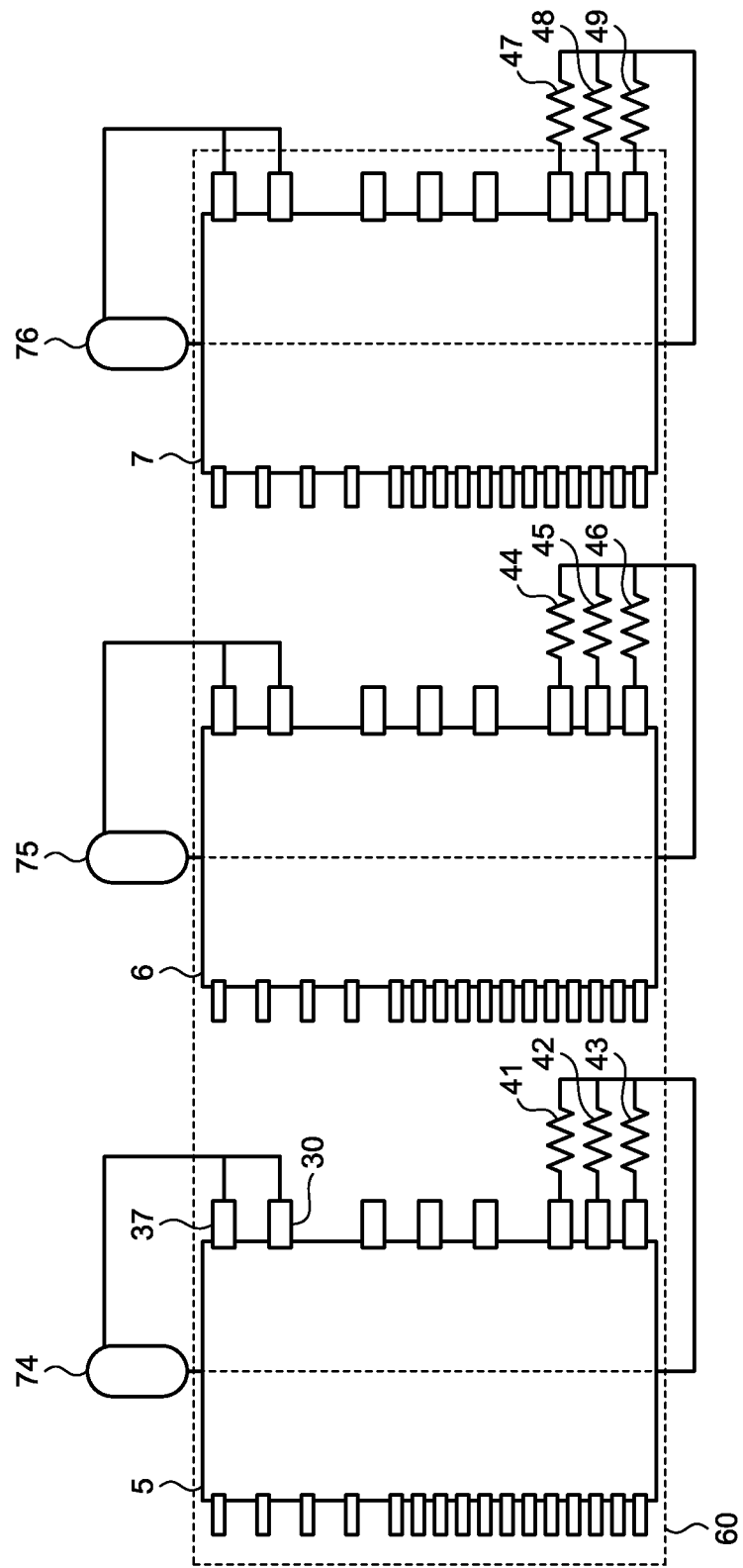
FIG. 11 is a diagram illustrating an example of the arrangement of capacitors according to the third embodiment.

When a capacitor that is a surge absorber for absorbing the voltage surge is provided, the capacitor is arranged in each inverter module. FIGS. 10 and 11 are diagrams each illustrating an example of the arrangement of the capacitors. Each of the inverter modules 5, 6, and 7 illustrated in FIGS. 10 and 11 has the terminal 37 that is an unused terminal and the terminal 30 that is a P terminal.

FIG. 10 illustrates an example where three capacitors are provided between the P side and N terminals in each inverter module. The capacitors are arranged at positions to not interfere with the inverter modules 5, 6, and 7 and the heat dissipation unit 60. Specifically, capacitors 70a, 70b and 70c are arranged on the substrate 61 not illustrated such that they adjoin the inverter module 5 and are outside the surface of projection of the heat dissipation unit 60 against the substrate 61. Similarly, capacitors 71a, 71b and 71c are arranged on the substrate 61 not illustrated such that they adjoin the inverter module 6 and are outside the surface of projection of the heat dissipation unit 60 against the substrate 61, and capacitors 72a, 72b, and 72c are arranged such that they adjoin the inverter module 7 and are outside the surface of projection of the heat dissipation unit 60 against the substrate 61.

FIG. 11 illustrates an example where the capacitor is arranged to be connected to a point of synthetic potential of three current detection resistors connected on the N-line side. Note that the resistors 41 to 43 are similar to the resistors 41 to 43 illustrated in FIG. 6. As with the resistors 41 to 43, resistors 44 to 46 and 47 to 49 are also current detection resistors in the inverter modules 6 and 7, respectively. The capacitors are arranged at positions to not interfere with the inverter modules 5, 6, and 7 and the heat dissipation unit 60. Specifically, a capacitor 74 is arranged on the substrate 61 not illustrated such that it adjoins the inverter module 5 and is outside the surface of projection of the heat dissipation unit 60 against the substrate 61. A capacitor 75 is arranged on the substrate 61 not illustrated such that it adjoins the inverter module 6 and is outside the surface of projection of the heat dissipation unit 60 against the substrate 61. A capacitor 76 is arranged on the substrate 61 not illustrated such that it adjoins the inverter module 7 and is outside the surface of projection of the heat dissipation unit 60 against the substrate 61.

The configuration illustrated in FIG. 11 allows the current detection resistor to serve as a resistor attenuating the voltage surge, and is thus more effective for surge suppression. Although not illustrated, a similar effect can also be obtained by interposing a resistor on the wire that returns to each capacitor from the P side terminal in the configuration illustrated in FIG. 10.

Moreover, as described in the first embodiment, when an unused terminal is available on the P side, it may be used as a dummy terminal, which may be connected to an adjacent terminal. In FIGS. 10 and 11, the terminal 37 that is a dummy terminal is connected to the terminal 30 that is the P terminal. Such a connection enables the modules to be distinguished from each other and can suppress heat generation in the terminal by branching the current into the two terminals.

Note that although FIGS. 10 and 11 illustrate an example where the inverter modules 5, 6, and 7 are arranged side by side in the direction orthogonal to the direction of alignment of terminals of the inverter modules 5, 6, and 7 on the substrate 61, the inverter modules 5, 6, and 7 may be rotated 90 degrees from those in the example in FIGS. 10 and 11 so as to be mounted such that the terminals of the three inverter modules 5, 6, and 7 are aligned.

Fourth Embodiment

Figure 12:
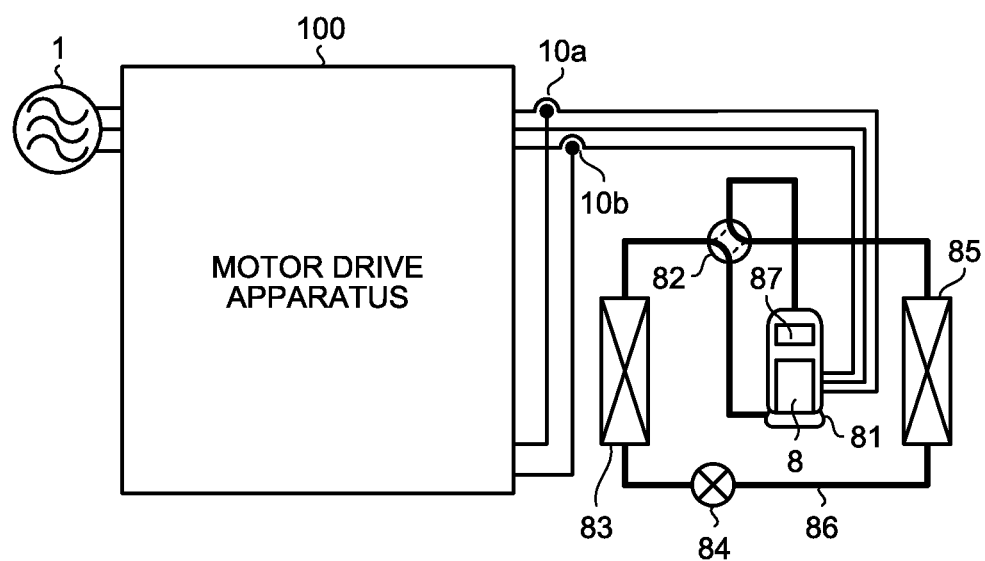
FIG. 12 is a diagram illustrating an example of the configuration of an air conditioner according to a fourth embodiment.

FIG. 12 is a diagram illustrating an example of the configuration of an air conditioner according to a fourth embodiment of the present invention. The air conditioner of the present embodiment includes the motor drive apparatus described in the first, second, or third embodiment. Although FIG. 12 illustrates an example where the air conditioner includes the motor drive apparatus 100 of the first embodiment, the air conditioner may include the motor drive apparatus of the second or third embodiment instead of the motor drive apparatus 100 of the first embodiment. The air conditioner of the present embodiment forms a split air conditioner that has a refrigeration cycle in which a compressor 81 that includes the motor 8 of the first embodiment, a four-way valve 82, an outdoor heat exchanger 83, an expansion valve 84, and an indoor heat exchanger 85 are connected by using refrigerant piping 86.

A compression mechanism 87 compressing a refrigerant and the motor 8 operating the compression mechanism 87 are provided inside the compressor 81, from which the refrigerant is circulated through the outdoor heat exchanger 83 and the indoor heat exchanger 85 to form the refrigeration cycle that performs cooling and heating. Note that the configuration illustrated in FIG. 12 can be applied not only to the air conditioner but an appliance that has the refrigeration cycle such as a refrigerator or freezing machine.

The air conditioner of the present embodiment includes the motor drive apparatus described in the first, second, or third embodiment and can thus achieve an increase in current at a low cost.

Moreover, a plurality of pairs of switching elements are provided for each phase; therefore, an operation can be continued by using any of the switching elements even when one of the switching elements fails. When a switching element fails, an operation such as issuing of an alarm to a user can be performed while continuing the operation at a lower performance level than usual.

The configurations described in the aforementioned embodiments illustrate examples of the content of the present invention and can be combined with another known technique or partly omitted or modified without departing from the gist of the present invention.

The invention claimed is:

1. A motor drive apparatus driving a motor, comprising:
inverter modules equivalent in number to phases of the motor; and
a control unit generating a PWM signal used to drive the inverter modules with PWM, wherein
the inverter modules each include a plurality of switching element pairs connected in parallel, each of the switching element pairs including two switching elements connected in series,
at least one of the inverter modules includes:
a first drive control unit configured to generate first PWM signals for controlling the switching elements provided in an upper arm of the switching element pairs; and
a second drive control unit configured to generate second PWM signals for controlling the switching elements provided in a lower arm of the switching element pairs, and
a pulse width of at least one of the first PWM signals or the second PWM signals is increased/decreased by an amount according to a temperature difference between the switching elements provided within the upper arm or within the lower arm.

2. The motor drive apparatus according to claim 1, further comprising a temperature measurement unit measuring a temperature inside the inverter modules, wherein
a pulse width of the PWM signal changes according to the temperature measured by the temperature measurement unit.

3. The motor drive apparatus according to claim 1, wherein the inverter modules are configured to distinguish between the inverter modules and a single module that is a module including switching element pairs equivalent in number to phases of the motor by performing an electrical continuity test.

4. The motor drive apparatus according to claim 1, further comprising a heat dissipation unit including a heat dissipating fin, wherein
the heat dissipation unit includes protrusions respectively connected to the inverter modules equivalent in number to the phases of the motor.

5. The motor drive apparatus according to claim 1, further comprising:
a heat dissipation unit including a heat dissipating fin; and
an auxiliary member connecting the heat dissipation unit and the inverter modules equivalent in number to the phases of the motor such that the inverter modules are connected at a same height.

6. The motor drive apparatus according to claim 1, further comprising a surge absorber for each of the inverter modules.

7. The motor drive apparatus according to claim 1, wherein the switching elements are made from a wide band-gap semiconductor.

8. An air conditioner comprising:
the motor drive apparatus according to claim 1; and
a compressor including the motor driven by the motor drive apparatus.

9. The motor drive apparatus according to claim 2, further comprising:
a drive control unit generating, for each of the inverter modules, an individual PWM signal for each of the switching element pairs in a corresponding one of the inverter modules on a basis of the PWM signal generated by the control unit and adjusting a pulse width of the individual PWM signal by using the temperature measured by the temperature measurement unit, wherein
the temperature measurement unit measures a temperature equivalent to at least two temperatures of switching elements in a same arm in a same inverter module.

10. The motor drive apparatus according to claim 3, wherein the inverter modules each include terminals equivalent in number to terminals included in the single module, and connect an unused terminal of the terminals to another terminal of the terminals.

11. The motor drive apparatus according to claim 4, wherein a passage of a cooling medium used to dissipate heat by the heat dissipating fin is orthogonal to a direction of alignment of the inverter modules.

12. The motor drive apparatus according to claim 4, further comprising a surge absorber for each of the inverter modules, wherein
the surge absorber is arranged on a substrate on which a corresponding one of the inverter modules is mounted such that the surge absorber adjoins the corresponding one of the inverter modules and is located at a position to not interfere with the heat dissipation unit.

13. The motor drive apparatus according to claim 5, wherein a passage of a cooling medium used to dissipate heat by the heat dissipating fin is orthogonal to a direction of alignment of the inverter modules.

14. The motor drive apparatus according to claim 5, further comprising a surge absorber for each of the inverter modules, wherein
the surge absorber is arranged on a substrate on which a corresponding one of the inverter modules is mounted such that the surge absorber adjoins the corresponding one of the inverter modules and is located at a position to not interfere with the heat dissipation unit.

15. The motor drive apparatus according to claim 7, wherein the wide band-gap semiconductor is silicon carbide.

16. The motor drive apparatus according to claim 9, wherein the drive control unit is provided in the inverter modules.

17. The motor drive apparatus according to claim 9, wherein the drive control unit is provided outside the inverter modules.

18. The motor drive apparatus according to claim 9, wherein the temperature measurement unit measures a temperature equivalent to a temperature of a switching element in the lower arm of the inverter modules.

19. The motor drive apparatus according to claim 9, wherein the drive control unit further adjusts a pulse width of the individual PWM signal on a basis of a measurement of a current flowing through a switching element in the lower arm of the inverter modules.

* * * * *